United States Patent Office 3,352,894
Patented Nov. 14, 1967

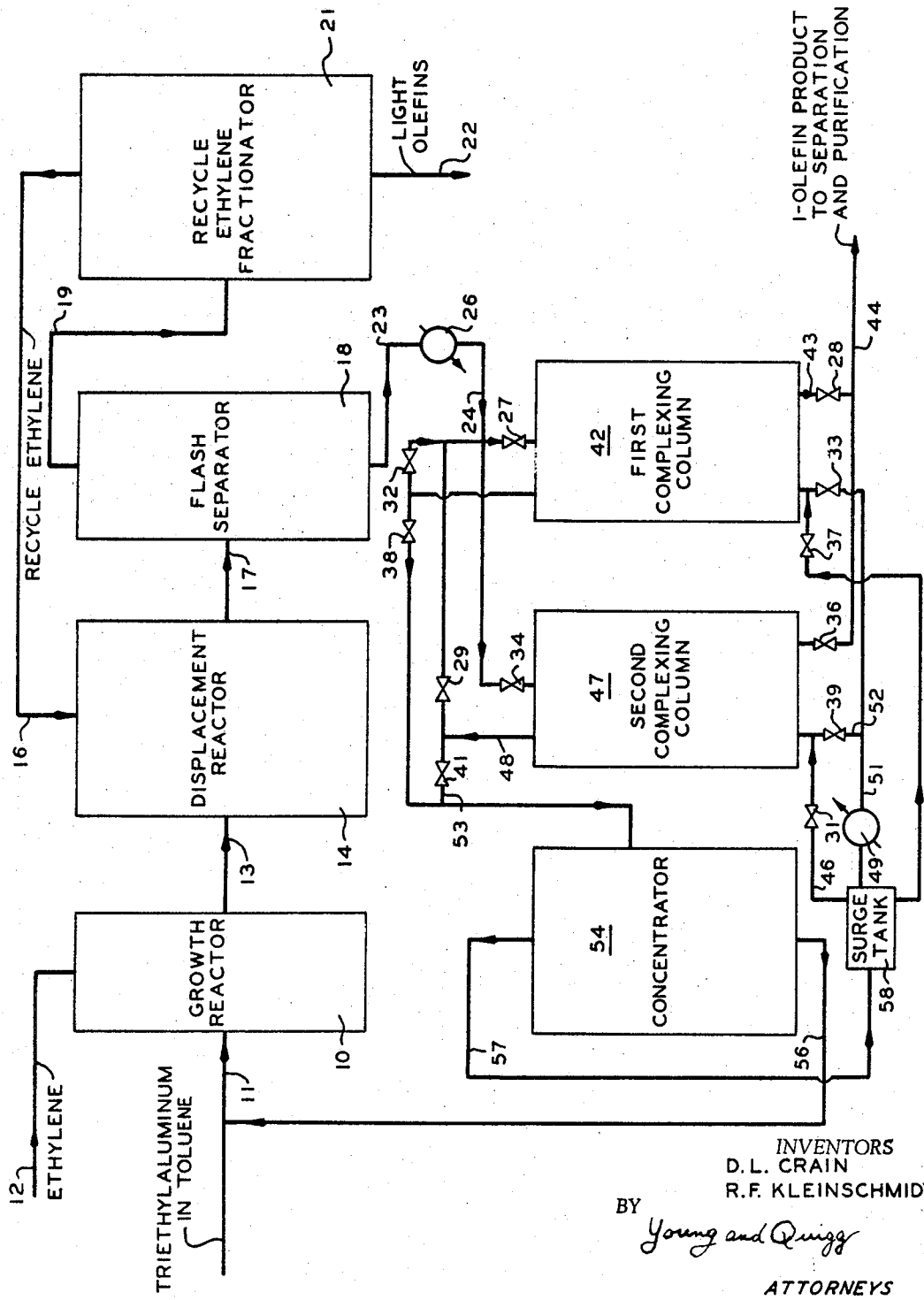

3,352,894
PROCESS FOR SEPARATING ORGANOMETALS FROM 1-OLEFINS
Donald L. Crain and Roger F. Kleinschmidt, Bartlesville, Okla., assignors to Phillips Petroleum Company, a corporation of Delaware
Filed Aug. 12, 1963, Ser. No. 301,292
8 Claims. (Cl. 260—448)

ABSTRACT OF THE DISCLOSURE

A mixture of a $R_nM$ compound and 1-olefins, formed in the process wherein a 1-olefin is reacted with an organometal having the formula $R_nM$ wherein R is an alkyl radical containing from 2–6 carbon atoms and M is a metal selected from the group consisting of aluminum, boron, beryllium, magnesium and zinc and $n$ is equal to the valence of the metal M so as to form metal alkyls having alkyl groups of higher molecular weight and said metal alkyls are then converted to a mixture of an $R_nM$ compound and 1-olefins having a carbon chain length equivalent in length to the alkyl radicals of the metal alkyls, is contacted with a polymer containing Lewis base groups having present therein atoms selected from the group consisting of oxygen, sulfur, selenium, nitrogen, phosphorus and arsenic so as to form a complex of said $R_nM$ compound with said polymer thereby permitting separate recovery of the 1-olefins from the system.

This invention relates to novel complexes of organometal compounds. In one aspect, the invention relates to a process in which novel complexes of organometal compounds are formed. In another aspect, the invention relates to a process for separating organometal compounds from admixture with liquid hydrocarbons.

There has recently been a great deal of interest in processes for the production of relatively high molecular weight, straight chain 1-olefins. To a great extent this interest has been generated because of their utility in the production of biodegradable detergents. The olefins also find many applications as intermediates in the production of a wide variety of products. One method for producing the olefins that has attracted widespread attention is the so-called growth reaction wherein an organometal, such as triethylaluminum, is reacted with ethylene. Under the reaction conditions, higher molecular weight trialkylaluminums are formed in which the alkyl substituents are normal alkyl groups. This growth product is then subjected to a displacement reaction in which the trialkylaluminums are contacted with ethylene under conditions of decreased pressure and increased temperature. Under these conditions, triethylaluminum and 1-olefins of a chain length equal to the chain length of the alkyl substituents prior to displacement are formed. In the practice of this process, it would be most desirable from an economic standpoint to recycle the triethylaluminum to the growth reaction step. However, the separation of these materials presents a major problem in the conduct of the growth and displacement process. Fractionation cannot be employed for the separation since triethylaluminum boils intermediate 1-dodecene and 1-tetradecene. The present invention provides a novel method for effecting the separation of organometals from admixture with liquid hydrocarbons.

It is an object of this invention to provide a process whereby novel complexes of organometals are formed.

Another object of the invention is to provide a process for separating organometals from admixture with other materials, e.g., hydrocarbons that are codistillable therewith.

A further object of the invention is to provide an improved process for the production of relatively high molecular weight, straight chain 1-olefins.

Other and further objects and advantages of the invention will become apparent to those skilled in the art upon consideration of the accompanying disclosure and the drawing which is a schematic flow diagram of a process for converting ethylene to relatively high molecular weight 1-olefins.

The present invention is concerned with a process in which novel complexes of organometals are formed. Broadly speaking, the process comprises the step of contacting an organometal having the formula $R_nM$, wherein R is selected from the group consisting of alkyl, aryl, cycloalkyl, aralkyl, and alkaryl radicals, M is a metal selected from the group consisting of aluminum, boron, beryllium, magnesium, and zinc, and $n$ is equal to the valence of the metal M, with a polymer containing Lewis base groups. Each R radical in the aforementioned formula generally contains from 1 to 18, inclusive, carbon atoms preferably from 2 to 6, inclusive, carbon atoms. The contacting of the organometal with the complexing agent, i.e., the polymer containing Lewis base groups, usually occurs in the presence of a hydrocarbon in which the $R_nM$ compound is dissolved or dispersed. Suitable hydrocarbons include aromatic hydrocarbons such as benzene, toluene, the xylenes, ethylbenzene and mixtures thereof. Paraffins, such as normal hexane, isohexane, normal decane and the like, can also be employed. It is also within the scope of the invention to use cycloparaffins, such as cyclohexane and methylcyclohexane, as well as mixtures of the various hydrocarbons.

The contacting of the organometal with the complexing agent may also take place in the presence of 1-olefins which have been prepared in a growth and displacement process as described above. Thus, in one embodiment, the process of this invention comprises the steps of contacting an $R_nM$ compound, wherein each R is an alkyl radical containing from 2 to 6, inclusive, carbon atoms and M and $n$ are as hereinbefore defined, in admixture with 1-olefins with a polymer containing Lewis base groups, and then separately recovering the 1-olefins. In another embodiment, in a process in which ethylene is reacted with an organometal having the formula $R_nM$, wherein each R is an alkyl radical containing from 2 to 6, inclusive, carbon atoms and M and $n$ are as described above, so as to form metal alkyls having alkyl groups of higher molecular weight, e.g., containing from 8 to 18, inclusive, carbon atoms and these metal alkyls are then converted by displacement with a Type I (terminal vinyl) olefin to a mixture of an $R_nM$ compound, in which each R is an alkyl radical containing no branching nearer the metal M than the 3 position, and preferably containing from 2 to 6 carbon atoms, and M and $n$ are as previously defined, and 1-olefins having a carbon chain length equivalent to the chain length of the alkyl radicals of the metal alkyls, the invention resides in the improvement which comprises contacting the mixture of the $R_nM$ compound and 1-olefins with a polymer containing Lewis base groups, thereby forming a complex of the $R_nM$ compound with the polymer, and then separately recovering the 1-olefins. Examples of the aforementioned type I olefins that can be used in the displacement reaction include ethylene, propylene, 1-butene, 1-hexene, 4-methyl-1-pentene, and the like. In still another embodiment, the complex that is formed is decomposed and the $R_nM$ compound is recovered.

Examples of organometals having the formula $R_nM$ include triethylaluminum, trimethylaluminum, triisopropylaluminum, triisobutylaluminum, tri-n-octylaluminum, tri-n-dodecylaluminum, tri-n-octadecylaluminum, triphenylaluminum, trinaphthylaluminum, tricyclohexylaluminum, tribenzylaluminum, tri-p-tolylaluminum, tri(12-phenyldodecyl)aluminum, tri(4 - dodecylphenyl)aluminum, trimethylboron, tri-n-propylboron, tri-n-hexylboron, tri-n-decylboron, tri - sectetradecylboron, trioctadecylboron triphenylboron, tri(2-phenylethyl)boron, tricyclohexylboron, tri(p-tolyl)boron, diethylberyllium, di-n-pentylberyllium, di-n-octadecylberyllium, diphenylberyllium, dibenzylberyllium, di(4-methylcyclohexyl)beryllium, di(3-methylphenyl)beryllium, dimethylmagnesium, diethylmagnesium, di-n-pentylmagnesium, di-sec-tetra-decylmagnesium, di-n-octadecylmagnesium, di(4-dodecylphenyl)magnesium, di(4-decylcyclooctyl)magnesium, diethylzinc, di-n-nonylzinc, di-n-octadecylzinc, and the like.

The polymers that are employed as complexing agents in the process of this invention contain a multiplicity of Lewis base groups. The Lewis base groups, which can be of the ionic or non-ionic types, have at least one atom present therein containing a pair of electrons which can form a covalent bond with a compound containing an atom having an open sextet of electrons or an atom whose octet can be expanded. Thus, the complexing agent of this invention can also be defined as being a polymer containing Lewis base groups having present therein atoms selected from the group consisting of oxygen, sulfur, selenium, nitrogen, phosphorus and arsenic. It is usually preferred that these atoms be present in such groups as ethers, thioethers, sulfones, selenoethers, tertiary amines, quaternary ammonium compounds, tertiary phosphines and tertiary arsines.

The polymers containing Lewis base groups can be prepared by several methods that are well known in the polymerization art. For example, a monomer containing one or more Lewis base functional groups can be homopolymerized or copolymerized with monomers which do not contain such groups. In another method of preparation, a polymer is prepared by polymerizing a monomer which does not contain a Lewis base functional group. This polymer is then crosslinked to a desired degree by reaction with a crosslinking agent which does contain a Lewis base functional group. For example, a para-chlorostyrene polymer can be crosslinked with a phenylphosphine dichloride to yield a crosslinked polymer containing phosphine groups. In still another method of operation, a polymer containing functional groups which are not Lewis base groups can be treated to replace the groups with Lewis base groups.

Examples of general types of polymers that can be employed as complexing agents include poly(alkylene oxides), poly(vinyl ethers), poly(alkylene sulfides), polymers of alkoxy-substituted vinylaromatic compounds, polymers of aryloxy-substituted vinylaromatic compounds, polymers of tertiary phosphine-substituted vinylaromatic compounds, polymers of alkyl amino-substituted vinylaromatic compounds, poly(arylene oxides), poly(arylene sulfides), poly(arylene sulfones), poly(allyl ethers), quaternized poly(vinyl pyridines), and the like. Some specific examples of polymers of the foregoing general groups are: poly(ethylene oxide), poly(propylene oxide), poly(butyl vinyl ether), poly(trimethylene sulfide), poly(tetramethylene sulfide), poly(p - methoxystyrene), poly(m-ethoxystyrene), poly(o-butoxystyrene), poly(p-phenoxystyrene), poly(1-vinyl-4-ethoxynaphthalene), poly(p-diphenylphosphinylstyrene), poly(p-chlorostyrene) subsequently reacted with diphenylarsine chloride in the presence of lithium, graft polymers of polypropylene with p-methoxystyrene, copolymers (including block, random and graft) of butadiene or isoprene with p-methoxystyrene, poly(p-diethylaminostyrene) and quaternized forms of this polymer, poly(phenylene oxide), poly(3-methyl phenylene oxide), poly(phenylene sulfide), poly(2-methoxyphenylene sulfide), and the like.

Examples of monomers containing Lewis base groups that can be homo- or co-polymerized so as to provide complexing agents according to this invention include p-methoxystyrene (4-vinylanisole), m-ethoxystyrene, p-phenoxystyrene, 1-vinyl-4-n-propoxynaphthalene, phenyl allyl ether, naphthyl vinyl ether, 2,4-dimethoxystyrene, benzyl vinyl ether, p-methoxy-alpha-methyl-styrene, p-methylthiostyrene, m-phenylthiostyrene, p-ethylselenostyrene, trimethylene sulfide, tetramethylene sulfide, p-dimethylaminostyrene, p-diethylaminostyrene, p-diphenylphosphinylstyrene, and the like. Examples of suitable comonomers that can be used include styrene, 1,3-butadiene, isoprene and the like.

The polymerization of the various types of monomers to form the complexing agents can be carried out according to conventional polymerization procedures, including solution, bulk, suspension, or emulsion polymerization. Polymerization initiators that can be used include free radical initiators, such as peroxides, organometal-type initiators, such as those formed from trialkylaluminums and titanium halides, and redox systems. Such polymerizations are usually carried out at a temperature in the range of 0 to 100° C. for a reaction period from 1 to 100 hours. Upon completion of the polymerization, the polymers can be recovered by any conventional method such as by coagulation, either by cooling or addition of a precipitating agent, steam stripping or the like. The actual preparation of these polymers is well known to those skilled in the art and does not constitute a part of the present invention.

The polymers containing Lewis base groups that are used as complexing agents in the practice of the present invention should be immiscible with the $R_nM$ compounds and the hydrocarbons in which the organometals are dissolved or dispersed. As a result of this immiscibility, the complex obtained by contacting the $R_nM$ compound with the polymer containing Lewis base groups forms a separate phase from the organometal or hydrocarbons in which the organometal may be dissolved or dispersed. Furthermore, the separate phase which forms can be physically separated from any uncomplexed material. In the event that the polymer containing Lewis base group is not of sufficiently high molecular weight to provide immiscibility, the polymer can then be crosslinked. Crosslinking can be readily effected either by treating the polymer with a chemical agent, such as divinyl benzene or trivinylcyclohexane, or by exposing the polymer to be crosslinked to ionizing radiation. It is to be understood that the crosslinking can be effected during preparation of the polymer, either from the beginning of the polymerization or at any intermediate stage, or the crosslinking can be carried out separately after the polymer has been formed. The complexing agents are usually extracted with a solvent, such as benzene or toluene, prior to use in order to remove low molecular weight polymers.

As mentioned above, because the organometal complex forms as a separate phase, it can be physically separated from the uncomplexed material. Because of the difficulty in separating organometals from admixture with higher 1-olefins by conventional methods, the present process is particularly applicable to the growth and displacement process in which such mixtures are obtained. Furthermore, it has been found that certain of the organometal complexes can be decomposed, at least to a certain extent, to the organometal and the complexing agent. As a result, the organometal can be recovered and thereafter employed in the growth reaction. In the conduct of the present process, it is preferred, therefore, to employ complexing agents which form complexes which can be decomposed to the organometal and complexing agent. Thus, within the broad class of complexing agents, it is preferred to use those whose heat of reaction with the $R_nM$ compound is less than 15 kilocalories per mol, preferably less than about 10 kilocalories per mol, of $R_nM$ compound. The heat of reaction of the complexing agents is indicative of the reversibility of the reacton, the lower the heat of reaction, the greater the reversibility of the reaction, or degradability to polymer and organometal.

The complexing of the $R_nM$ compound with the polymer containing Lewis base groups is generally carried out by contacting the materials at a temperature in the range of 0 to 150° C. The pressure employed in the complexing zone will normally be autogenous and can range from subatmospheric pressures to superatmospheric pressures. The time for the complexing can vary within a rather wide range, e.g., from about 1 minute to 10 hours or longer although a period of 2 hours or less is usually sufficient. The theoretical upper limit for the amount of the $R_nM$ compound that is complexed is 1 mol of the compound per Lewis base site present in the complexing agent. Thus, the amount of $R_nM$ compound that can be complexed by a given volume or weight of polymer containing Lewis base groups depends on the number of such groups present in the polymer. Thus, per unit weight of polymer, a cross-linked homopolymer of p-methoxystyrene will complex more triethylaluminum than a 50/50 copolymer of p-methoxystyrene/1,3-butadiene. In addition to the chemical complexing of the $R_nM$ compound, some physical adsorption of the compound and hydrocarbon in the mixture occurs. In this case the polymer merely acts as a sponge, retaining material in void spaces in the polymer.

After the $R_nM$ material has been complexed with the polymer containing Lewis base groups, the resulting complex can be readily separated from the uncomplexed material by such methods as filtration, decantation and the like. When a complexing agent is used that forms a decomposable complex, the complex can then be decomposed, at least in part, to regenerate free $R_nM$ compound and polymer containing Lewis base groups which can be re-used. The decomposition or elution is generally accomplished by heating the organometal complex to a temperature in the range of 0 to 250° C. While it is possible to carry out the elution at a temperature lower than that used in the complexing, the elution is generally conducted at a temperature above that utilized for complexing.

Reference is now made to the drawing which shows a schematic flow diagram for a growth and displacement process to which this invention is particularly applicable. Items of equipment such as compressors, accumulators, pumps, condensers and the like, which are used to obtain the desired operating conditions, have been omitted from the flow diagram, but their use is well known to those skilled in the art. While specific materials are referred to in describing the flow diagram, it is to be understood that other organoaluminum compounds, hydrocarbon solvents, and complexing agents, as described above, can be employed.

As shown in the drawing, a 25 percent by weight solution of triethylaluminum in toluene is charged to growth reactor 10 through line 11. Simultaneously, ethylene is introduced into reactor 10 through line 12 at a rate such that the pressure in the reactor is maintained at approximately 2400 p.s.i.g. although pressures in the range of 1000 to 2500 p.s.i.g. are satisfactory. The ethylene so supplied is sufficient to provide ethylene for growth to the desired average molecular weight trialkylaluminum plus an excess of approximately 3 mols of ethylene per mol of aluminum present. The temperature in the growth reactor is maintained in the range of about 110 to 130° C. by supplying sufficient cooling to remove heat generated by the exothermic polymerization reaction occurring in the reactor. This can be readily accomplished by utilizing a reactor provided with suitable cooling means, such as cooling coils or cooling jackets. The feed rates of the reactants and the volume of reactor 10 are such that the residence time therein is approximately 2.0 hours. However, residence times in the range of 0.5 to 4.0 hours can be used in carrying out the growth step. The growth reactor itself can be in the form of a tube-type reactor, or one or more reaction vessels provided with stirring means can be employed. While the flow diagram depicts a continuous-type operation, the growth reaction can be conducted in a multiplicity of batch operations. The growth reaction product, which comprises primarily trialkylaluminums having alkyl groups containing from 10 to 18 carbon atoms as well as some trialkylaluminums of higher and lower molecular weights, unconverted ethylene, unreacted triethylaluminum and toluene, is withdrawn from the growth reactor through line 13 and then passed into displacement reactor 14.

In displacement reactor 14, the pressure is decreased to a pressure in the approximate range of 50 to 150 p.s.i.g., and the temperature is increased to about 300° C. Additional ethylene is charged to displacement reactor 14 by means of recycle ethylene line 16, the amount charged being sufficient to provide about 30 mols of ethylene per mol of aluminum present. Under these conditions, the trialkylaluminums produced in growth reactor 10 are converted to triethylaluminum and 1-olefins having a carbon chain length equivalent to the chain length of the alkyl radicals of the trialkylaluminums from the growth reaction.

The reaction mixture formed in displacement reactor 14 is withdrawn therefrom through line 17 and then passed into flash separator 18. In the flash separation zone, ethylene and some light 1-olefins are flashed overhead through line 19 to recycle ethylene fractionator 21. Ethylene is taken overhead from fractionator 21 and then recycled via line 16 to displacement reactor 14. It is more economical to recycle the ethylene to the displacement reactor than to the growth reactor since the ethylene would have to be recompressed to a relatively high pressure if it were to be recycled to the growth zone. The bottoms from fractionator 21 comprising light olefins are withdrawn through line 22.

The bottoms from flash separator 18, which normally comprise 1-olefins, triethylaluminum, some undisplaced growth product and toluene are withdrawn through line 23. This stream can be passed directly to the complexing section, or if desired, can first be subjected to an additional separation to remove undisplaced trialkylaluminum and heavy olefins prior to complexing. Before passing to the complexing section through line 24, the bottoms are cooled in cooler 26 to a temperature of approximately 25° C. Under stable, continuous operation conditions, the valves in the various lines associated with the complexing columns are positioned as follows: valves 27, 28, 29 and 31 are open and valves 32, 33, 34, 36, 37, 38, 39 and 41 are closed. Thus, the mixture in line 24 passes through complexing column 42 which is packed with a bed of insoluble crosslinked poly(p-methoxystyrene). This polymer can be prepared by polymerizing p-methoxystyrene at a temperature in the range of 75° to 100° C. with a peroxide initiator and in the presence of a crosslinking agent such as divinylbenzene. As the reaction mixture in line 24 flows downwardly through the bed of polymer in column 42, triethylaluminum is complexed with the polymer containing Lewis base groups (methoxy groups). The resulting mixture of toluene and 1-olefins is removed from column 42 through line 43 and then passed to product separation and purification means (not shown) by means of line 44.

Simultaneously, as complexing is being carried out in column 42, the bed of polymer in column 47, already complexed with triethylaluminum, is being washed to remove 1-olefins and uncomplexed triethylaluminum which is physically adsorbed on the polymer. In this washing step, toluene passes through line 46 and open valve 31 upwardly through column 47 and thence through line 48 and open valve 29, discharging into line 24. Thus, the uncomplexed triethylaluminum washed out of the polymer bed in 47 is passed downwardly through the polymer bed in column 42 during its complexing cycle. At the completion of washing of the polymer bed in column 47, but still during complexing of triethylaluminum in column 42, valves 29 and 31 are closed, and valves 39 and 41 are opened. Hot toluene then passes via heater 49, lines 51 and 52 and open valve 39 upwardly through the polymer bed of column 47, decomposing the complex and eluting the thus formed free triethylaluminum from the bed. The resulting solution of triethylaluminum in toluene (1 to 2 percent by weight triethylaluminum) passes through line 48, open valve 41 and line 53 to concentrator 54. In this column, the solution is concentrated to approximately 25 weight percent triethylaluminum by distilling toluene off overhead. The bottoms from concentrator 54, which pass via line 56 to line 11, are thus recycled to growth reactor 10.

The toluene taken overhead from concentrator 54 passes through line 57 to surge tank 58. The toluene in surge tank 58 provides the wash fluid and elution solvent for the washing and elution steps described.

When triethylaluminum begins to appear in the effluent from column 42, thereby indicating that the polymer is loaded with complexed triethylaluminum, and as triethylaluminum begins to disappear from the solution in line 48, proper manipulation of the manifolded valve system is effected to begin a complexing cycle in column 47 and to begin a wash cycle in column 42 as described. It is to be understood that any number of complexing columns can be utilized, the number being dependent upon such variables as stream flows, concentrations, type of complexing, cycle times and the like.

A more comprehensive understanding of the invention can be obtained by referring to the following illustrative examples which are not intended, however, to be unduly limitative of the invention.

EXAMPLE I

A polymer of p-methoxystyrene was prepared and employed for the complexing of a $R_nM$ compound according to the process of this invention.

The polymer preparation was carried out by mixing 46.4 grams of p-methoxystyrene, 3 ml. of a 50 percent solution of divinylbenzene (approximately 1.2 grams divinylbenzene) and 0.25 gram of benzoyl peroxide. This mixture was heated to 80° C. in an oven and maintained at this temperature for 24 hours. The resulting polymer was washed 4 times in a Waring Blendor with methyl alcohol, after which the polymer was boiled with benzene. After filtering the polymer out of the benzene, it was washed with methyl alcohol and dried at 1 mm. Hg absolute pressure and 25° C. for 24 hours.

A 7.51 gram sample of the above prepared polymer was contacted with 20 ml. of 25 percent by weight triethylaluminum in cyclohexane (3.94 grams triethylaluminum) in an inert atmosphere. The solution was then diluted with 40 ml. of benzene so that the polymer was covered with liquid. After 15 minutes, the liquid was filtered, and the polymer was washed with three 30 ml. portions of benzene to remove uncomplexed triethylaluminum. The filtrate and wash liquid were combined and then the TEA hydrolyzed in 10 percent aqueous $H_2SO_4$, and the aqueous layer was analyzed for aluminum content. The uncomplexed triethylaluminum amounted to 0.802 gram, while the triethylaluminum remaining on the polymer amounted to 3.04 grams (by difference).

In another run, a 5.91 gram sample of the polymer was contacted with 20 ml. of a 25 percent by weight solution of triethylaluminum in cyclohexane. The mixture was allowed to stand at about 25° C. for 20 minutes, after which the polymer was filtered out and washed with cyclohexane. The filtrate and washings were hydrolyzed as above and analyzed for aluminum content. The uncomplexed triethylaluminum amounted to 2.15 grams, and the triethylaluminum remaining on the polymer amounted to 1.79 grams (by difference). The polymer was extracted with three 50 ml. portions of boiling cyclohexane, filtering the hot mixture each time. Of the 1.79 grams of triethylaluminum retained by the polymer, 0.51 gram was eluted by treatment with hot cyclohexane as determined by hydrolysis as above.

EXAMPLE II

A polymer was prepared by polymerizing 40.4 grams of freshly distilled p-methoxystyrene in the presence of 0.22 gram of benzoyl peroxide and 2.0 ml. of a 50 percent by weight solution of divinylbenzene (approximately 0.8 gram of divinylbenzene) at 80° C. for 60 hours and under a nitrogen atmosphere. At the end of this time, about one half of the material was a white, puffy polymer distributed through a clear, jelly-like polymer. The reaction mixture was removed and chopped in a Waring blendor in methanol. The insoluble solid polymer was then filtered from the methanol, pressed dry, and suspended in approximately 500 ml. of boiling benzene. After boiling the mixture for 10 minutes, the polymer was filtered, and the boiling was repeated with fresh benzene to insure complete removal of monomer and low molecular weight polymer.

A 22.3 gram sample of the dry polymer was then contacted with 100 ml. of a 25 percent by weight solution of triethylaluminum (TEA) in cyclohexane (19.7 grams of triethylaluminum) under a nitrogen atmosphere. The mixture was boiled for 5 minutes, allowed to stand for 10 minutes, after which 50 ml. of cyclohexane and 22 ml. of toluene were added. The mixture was then boiled for 5 minutes and allowed to cool over a 30 minute period. The mixture was then filtered through a medium-porosity sintered glass funnel, and the polymer was washed with two 150 ml. portions of dry cyclohexane. The combined filtrate and washings were then hydrolyzed with 10 percent aqueous $H_2SO_4$ as above and the aqueous layer was analyzed for aluminum content. This complexing run is Run 1 of Table I shown hereinafter.

Assuming that each methoxy group will complex with 1 mol of TEA, the polymer sample (22.3 grams) could complex with 18.95 grams of TEA. Since it had retained only 14.82 grams of TEA, theoretically there were active methoxy groups in the polymer. Accordingly, in Run 2 as described below, additional triethylaluminum was contacted with the partially loaded polymer.

In Run 2, the polymer containing TEA from Run 1 was treated with 60 ml. of 25 percent triethylaluminum in cyclohexane for 16 hours at 25° C. prior to filtering. The weight of triethylaluminum used was 11.82 grams. After the polymer had been filtered and washed with 125 ml. of cyclohexane, the final filtrate was then hydrolyzed as before. The loaded polymer was then eluted (Run 3) by extraction with two 125 ml. portions of boiling cyclohexane. The hot solutions were boiled with the polymer for 4 minutes before filtering. The combined filtrates were then hydrolyzed with 10 percent $H_2SO_4$ as above, following which the aqueous phase was analyzed for aluminum content. These complexing and elution cycles were then repeated several times as outlined below.

*Summary of additional complexing and elution runs*

| Run No. | Complexing or Elution | Grams Triethylaluminum | Solvent |
| --- | --- | --- | --- |
| 4 | C | 3.94 | 80 ml. $C_6H_{12}$ [1] for 20 minutes. |
| 5 | E | | Two 100 ml. portions hot $C_6H_{12}$. |
| 6 | C | 2.96 | 85 ml. $C_6H_{12}$ for 30 minutes. |
| 7 | E | | As in Run 5. |
| 8 | C | 2.17 | 90 ml. $C_6H_{12}$ for 30 minutes. |
| 9 | E | | As in Run 5. |

[1] Cyclohexane.

The results of the runs are tabulated below in Table I. The amounts of triethylaluminum shown are from the analyses of the hydrolyzed phases.

TABLE I

| Run No. | TEA added, g. | TEA retained from run, g. | Total TEA on Polymer, g. | TEA eluted, g. |
|---|---|---|---|---|
| 1 | 19.725 | 14.815 | 14.815 | |
| 2 | 11.838 | 2.663 | 17.478 | |
| 3 | | | 15.869 | 1.600 |
| 4 | 3.945 | 1.157 | 17.026 | |
| 5 | | | 16.042 | 0.984 |
| 6 | 2.959 | 1.159 | 17.191 | |
| 7 | | | 16.217 | 0.984 |
| 8 | 2.170 | 0.803 | 17.020 | |
| 9 | | | 16.221 | 0.799 |

EXAMPLE III

A run was carried out in which poly(p-methoxystyrene) was employed for the complexing of triethylaluminum from a solution of triethylaluminum (TEA) in 1-octene. The poly(p-methoxystyrene) was prepared by the suspension polymerization of p-methoxystyrene, and was crosslinked with divinylbenzene.

A bed of 13.6 grams of this polymer in a column was contacted (Run 1) with 20 ml. of triethylaluminum (25 weight percent) in cyclohexane, drained and washed twice with cyclohexane at 25° C. Elution (Run 2) was effected with methylcyclohexane at 150° C. at 10 cc./min. for 30 minutes.

A solution containing 20 grams TEA, 88 grams 1-octene and 60 grams cyclohexane was prepared. The bed of polymer was then contacted with 20 ml. of this solution at 25° C. After standing for about 60 hours, the solution was drained, and the polymer was washed with cyclohexane. The polymer was covered with solvent, allowed to stand for 2 minutes, and the solvent was drained. Two additional washings were carried out in the same manner. The combined washings and solvent was contacted with 50 ml. of 10 percent by weight aqueous $H_2SO_4$ to hydrolyze the TEA, and the aqueous phase was analyzed for aluminum content. The amount of triethylaluminum remaining on the polymer was then calculated on this basis (Run 3). The jacket surrounding the polymer bed was then heated to 150–160° C. by circulating hot silicone oil through the jacket, and decalin was pumped through the polymer bed at 10 cc./min. for 30 minutes. The solution was drained from the column, and this solution was hydrolyzed with 50 cc. of 10 percent by weight aqueous $H_2SO_4$ to determine TEA content (Run 4). The hydrocarbon layer was separated and fractionated. A forecut of 16.1 grams was obtained, boiling 80–185° C. (boiling point of decalin, 185° C.). A gas chromatogram revealed 83.7 percent cyclohexane, 6.3 percent 1-octene and 10.0 percent decalin. Thus 13.5 grams of cyclohexane and 1.0 gram of octene was recovered.

An additional 20 ml. of the TEA-octene solution was then placed on the polymer and allowed to stand at 25° C. for 2 hours. The column was then drained and washed as the previous run, following which elution was carried out as in the previous runs. This complexing and elution are labeled Runs 5 and 6 in the Table II below.

A 20 ml. sample of the TEA-octene solution was then placed on the polymer and allowed to stand for 1 hour. Three times the bed was drained for 2 minutes, and then covered with cyclohexane at 25° C. for from 5 to 10 minutes. The bed was then drained for 2 minutes and hot silicone oil (160° C.) was circulated through the jacket for 30 minutes at 10 cc./min. The column was then drained for 2.0 minutes, and the drainings were combined with the effluent and hydrolyzed (Run 8).

The organic phase from Run 6 was fractionated, and the cut boiling 80–185° C. weighed 17.5 grams. A gas chromatogram of a sample from the cut showed 64.7 percent cyclohexane, 9.45 percent octene and 4.53 percent decalin. Thus, the 17.5 gram sample contained 1.65 grams of 1-octene.

The organic phase from Run 8 was fractionated, and the cut boiling 80–185° C. weighed 19.5 grams. This cut contained 81.97 weight percent cyclohexane, 5.38 weight percent 1-octene and 12.65 weight percent decalin. Therefore 1.05 grams of this cut was 1-octene.

TABLE II

| Run No. | Complexing or Elution | Grams TEA Charged | Grams TEA in Effluent | Grams TEA Remaining on Polymer | Grams TEA Eluted | Grams Complexed TEA [1] |
|---|---|---|---|---|---|---|
| 1 | C | 4.04 | 2.08 | 1.96 | | |
| 2 | E | | | | 1.82 | (²) |
| 3 | C | 1.77 | 0.76 | 1.01 | | |
| 4 | E | | | | 1.37 | 1.14 |
| 5 | C | 1.77 | 0.82 | 0.95 | | |
| 6 | E | | | | 0.95 | 0.58 |
| 7 | C | 1.77 | 1.06 | 0.71 | | |
| 8 | E | | | | 0.88 | 0.60 |

[1] Calculated as grams TEA eluted—TEA from free space as determined by 1-octene content of fractionated samples.
² Not determined.

EXAMPLE IV

Crosslinked poly(p-phenoxystyrene) was prepared by the suspension polymerization of p-phenoxystyrene in the following manner. Thirty milliliters of p-phenoxystyrene and 4 ml. of commercial (50 percent) divinylbenzene in 150 ml. of water containing 2 grams of a 12 percent solution of sodium polyacrylate (dispersant) and 0.5 gram benzoyl peroxide were admixed. After 2 hours of stirring and heating to cause refluxing, some solid polymer particles had formed. After heating and stirring for an additional 3 hours, the solid polymer was filtered out, washed with water, and extracted overnight with methanol. The yield of dried poly(p-phenoxystyrene) was 30.5 grams. This polymer was extracted with refluxing benzene to remove low molecular weight polymer.

The above-prepared poly(p-phenoxystyrene) was employed for the complexing of triethylaluminum in the following manner.

A 19.4 gram sample of the dry polymer was packed into a column fitted with a heating jacket and with means for charging triethylaluminum solution and either cyclohexane or methylcyclohexane wash fluid. This polymer was covered with 20 ml. of 25 percent by weight triethylaluminum (TEA) in cyclohexane (4.04 grams TEA). This solution was left in contact with the polymer for 30 minutes, following which the liquid was drained and the TEA hydrolyzed (Run 1). A 17 ml. sample of 25 percent TEA in cyclohexane (3.4 grams TEA) was then placed on the polymer at 25° C. for 30 minutes. At this time, cyclohexane was pumped up through the polymer for 20 minutes at 10 cc./min., and the effluent was drained and hydrolyzed (Run 2). Cyclohexane wash was continued for 10 more minutes, after which the column and overhead was drained, combined, and hydrolyzed (Run 3). At this point, oil was circulated through the heating jacket at 100–105° C. while methylcyclohexane was pumped through the polymer bed at 10 cc./min. The effluent and the column was drained, and the combined solutions hydrolyzed (Run 4). A 20 ml. sample of 25 percent TEA in cyclohexane (4.04 grams of TEA) was left on the polymer overnight. The next day, the column was drained and washed twice with cyclohexane. The combined washings and column drainings was hydrolyzed in 50 cc. of 10 percent aqueous $H_2SO_4$ (Run 5). The polymer was eluted at 100° C. with methylcyclohexane for 30 minutes at 10 cc./min. The overhead and the solution in the column were combined and hydrolyzed (Run 6). The polymer was then contacted with 20 ml. of 25 percent TEA in cyclohexane (4.04 grams TEA) for 30 minutes at 25° C., after which the solution was drained from the column and the column washed twice with cyclohexane. The combined solutions were then hydrolyzed (Run 7). Elution with hot methylcyclohexane was then carried out as before (Run 8). The polymer was then contacted with 20 ml. of 25 percent TEA in cyclohexane for 30 minutes and drained, washed and worked up as before (Run 9), except that elution was then carried out at 25° C. for 30 minutes by pumping cyclohexane through the polymer at 10 ml./minute. Further elution was effected at 100° C. with methylcyclohexane for 30 minutes (Run 11). The results of these runs are shown below in Table III.

TABLE III

| Run | Complex-ing or Elution | Grams TEA in Effluent | Grams TEA Adsorbed by Difference | Grams TEA Eluted | Total TEA Retained on Polymer, Grams |
|---|---|---|---|---|---|
| 1 | C | 1.62 | 2.82 | | 2.82 |
| 2 | C | 2.50 | 0.90 | | 3.72 |
| 3 | E | 0.506 | | 0.506 | 3.21 |
| 4 | E | 1.68 | | 1.68 | 1.53 |
| 5 | C | 2.17 | 1.87 | | 3.40 |
| 6 | E | 1.55 | | 1.55 | 1.85 |
| 7 | C | 2.24 | 1.80 | | 3.65 |
| 8 | E | 1.81 | | 1.81 | 1.84 |
| 9 | C | 2.19 | 1.85 | | 3.69 |
| 10 | E | 0.857 | | 0.857 | 2.83 |
| 11 | E | 1.172 | | 1.172 | 1.66 |

EXAMPLE V

A run was carried out in which triethylaluminum (TEA) was complexed with high molecular weight poly(ethylene oxide). In this run, an 0.954 gram sample of ethylene oxide polymer which had been dried for 1 week with $P_2O_5$ was placed in a 25 cc. Diels-Alder tube which was capped under nitrogen. To this polymer there was then added 10 cc. of a 1.67 molar solution of TEA in cyclohexane. No gas was evolved during the addition. A sample of the liquid was withdrawn and hydrolyzed, and it was found that 0.0037 mol of the TEA had been complexed. The polymer and TEA solution were then allowed to stand for 1.5 hours, and a second sample was withdrawn and hydrolyzed. This analysis indicated that 28 mol percent of the triethylaluminum (.00469 mol) was complexed. In another run, a 18.8 gram sample of the dried ethylene oxide polymer was placed in a 100 ml. flask in a nitrogen atmosphere. Twenty cubic centimeters of the 1.67 molar solution of TEA in cyclohexane was then added by syringe through the rubber cap with which the flask was closed. The solution became warm and some vapors were evolved. The total amount of solution added was equivalent to 0.034 mol of TEA. The mixture was allowed to stand overnight, after which a sample of the cyclohexane solution was withdrawn and hydrolyzed. The amount of TEA remaining in the uncomplexed liquid was very low, and it was evident that substantially all of the TEA was complexed.

The polymer-complex was then subjected to vacuum distillation in an attempt to distill the TEA off of the complex. However, even at a pot temperature of 180° C. and a vacuum of 0.8 mm. mercury absolute, only a trace of liquid was observed. It is apparent that this ethylene oxide polymer forms a very strong complex with TEA, and that this complex is irreversible under the regeneration conditions used.

The data in the foregoing examples demonstrate that the process of this invention can be employed to separate organometals from admixture with other materials, such as 1-olefins. Furthermore, the data show that the separated organometals can thereafter be recovered for subsequent re-use. The complex that is prepared can also be stored as such and subsequently used as a source of organometals for chemical reactions.

As will be evident to those skilled in the art, many variations and modifications of the invention can be practiced in view of the foregoing disclosure. Such variations and modifications are believed to come within the spirit and scope of the invention.

We claim:

1. A process for separating organometals from 1-olefins which comprises contacting an organometal having the formula $R_nM$, where R is an alkyl radical containing from 2 to 6 inclusive, carbon atoms, M is a metal selected from the group consisting of aluminum, boron, beryllium, magnesium and zinc, and $n$ is equal to the valence of the metal M, in admixture with 1-olefins with a polymer containing Lewis base groups having present therein atoms selected from the group consisting of oxygen, sulfur, selenium, nitrogen, phosphorus, and arsenic, said polymer being immiscible with said organometal and said 1-olefins; and thereafter separately recovering said 1-olefins.

2. The process of claim 1 in which said organometal is triethylaluminum and said polymer is poly(p-methoxystyrene).

3. The process of claim 1 in which said organometal is triethylaluminum and said polymer is poly(p-phenoxystyrene).

4. The process of claim 1 in which said organometal is triethylaluminum and said polymer is poly(ethylene oxide).

5. In a process in which ethylene is reacted with an organometal having the formula $R_nM$, wherein each R is an alkyl radical containing from 2 to 6, inclusive, carbon atoms, M is a metal selected from the group consisting of aluminum, boron, beryllium, magnesium and zinc, and $n$ is equal to the valence of the metal M, so as to form a mixture of an $R_nM$ compound in which R is an alkyl radical containing no branching nearer the metal M than the 3 position, and M and $n$ are as defined above, and higher 1-olefins, the improvement which comprises contacting said mixture of an $R_nM$ compound and 1-olefins with a polymer containing Lewis base groups having present therein atoms selected from the group consisting of oxygen, sulfur, selenium, nitrogen, phosphorus and arsenic, thereby forming a complex of said $R_nM$ compound with said polymer; and separately recovering said 1-olefins.

6. The process of claim 5 in which said contacting occurs in the presence of a hydrocarbon selected from the group consisting of aromatic, paraffinic and cyclo-paraffinic hydrocarbons at a temperature in the range of zero to 150° C. and under autogenous pressure.

7. In a process in which ethylene is reacted with triethylaluminum so as to form aluminum alkyls having alkyl groups containing from 10 to 18, inclusive, carbon atoms and said aluminum alkyls are then converted to triethylaluminum and 1-olefins having a carbon chain length equivalent to chain length of said alkyl groups of said aluminum alkyls, the improvement which comprises introducing a mixture of said triethylaluminum and said 1-olefins into a complexing zone having disposed therein a polymer containing Lewis base groups having present therein atoms selected from the group consisting of oxygen, sulfur, selenium, nitrogen, phosphorus and arsenic, said polymer being immiscible with said triethylaluminum and said 1-olefins and said complexing zone being at a temperature in the range of zero to 150° C. and at a pressure ranging from subatmospheric pressure to superatmospheric pressure; and withdrawing from said complexing zone a stream containing 1-olefins and substantially no triethylaluminum.

8. The process of claim 7 in which, after removal of the said 1-olefin stream, said polymer in said complexing zone is heated to a temperature in the range of zero to 250° C. by introducing thereinto a heated hydrocarbon stream, and a hydrocarbon stream containing triethylaluminum is recovered from said complexing zone.

References Cited

UNITED STATES PATENTS

| | | | |
|---|---|---|---|
| 3,035,105 | 5/1962 | Hoffman | 260—683.15 |
| 3,078,308 | 2/1963 | Brown | 260—606.5 |
| 3,217,020 | 11/1965 | Ziegler et al. | 260—665 |

OTHER REFERENCES

Die Makromolekulare Chemie, Bd. 47, No. 2–3, pages 242–246 (1961).

TOBIAS E. LEVOW, *Primary Examiner.*

H. M. S. SNEED, *Assistant Examiner.*